(12) United States Patent
Leibfried et al.

(10) Patent No.: US 6,705,011 B1
(45) Date of Patent: Mar. 16, 2004

(54) TURBINE ELEMENT MANUFACTURE

(75) Inventors: Peter E. Leibfried, Vernon, CT (US); Brian J. Hamilla, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/361,279

(22) Filed: Feb. 10, 2003

(51) Int. Cl.7 .................................................. B23P 15/00
(52) U.S. Cl. .................................... 29/889.72; 29/889.7
(58) Field of Search ............................ 29/889.7, 889.72, 29/889.721, 557, 558, 463, 412, 416, 417, 428; 228/157; 416/232

(56) References Cited

U.S. PATENT DOCUMENTS

| 3,004,607 A | 10/1961 | Linnabery et al. |
| 3,588,980 A | 6/1971 | Cogan |
| 3,628,226 A | 12/1971 | Nelson |
| 4,257,737 A | 3/1981 | Andress et al. |
| 4,594,761 A | 6/1986 | Murphy et al. |
| 4,642,863 A | 2/1987 | Schulz |
| 4,726,101 A | 2/1988 | Draghi et al. |
| 5,018,271 A | 5/1991 | Bailey et al. |
| 5,063,662 A | 11/1991 | Porter et al. |
| 5,083,371 A | 1/1992 | Leibfried et al. |
| 5,099,573 A | 3/1992 | Krauss et al. |
| 5,123,814 A | 6/1992 | Burdick et al. |
| 5,222,297 A | 6/1993 | Graff et al. |
| 5,253,419 A | 10/1993 | Collot et al. |
| 5,269,658 A | 12/1993 | Carlson et al. |
| 5,323,536 A | 6/1994 | Fowler et al. |
| 5,448,829 A | 9/1995 | Dillner et al. |
| 5,469,618 A | 11/1995 | LeMonds et al. |
| 5,479,704 A | 1/1996 | Richter et al. |
| 5,636,440 A | 6/1997 | Bichon et al. |
| 5,692,881 A | 12/1997 | Leibfried |
| 5,711,068 A | 1/1998 | Salt |
| 5,826,332 A | 10/1998 | Bichon et al. |

*Primary Examiner*—I Cuda Rosenbaum
(74) *Attorney, Agent, or Firm*—Bachman & LaPointe, P.C.

(57) ABSTRACT

A hollow element such as a turbine blade is manufactured by cutting a metallic member into first and second pieces so that each has a cut side and an opposite uncut side. The cut sides are machined to form interior features of the element. The uncut sides are machined to form exterior features of the element. The pieces are assembled with the cut sides facing each other and the assembly is diffusion bonded.

10 Claims, 3 Drawing Sheets

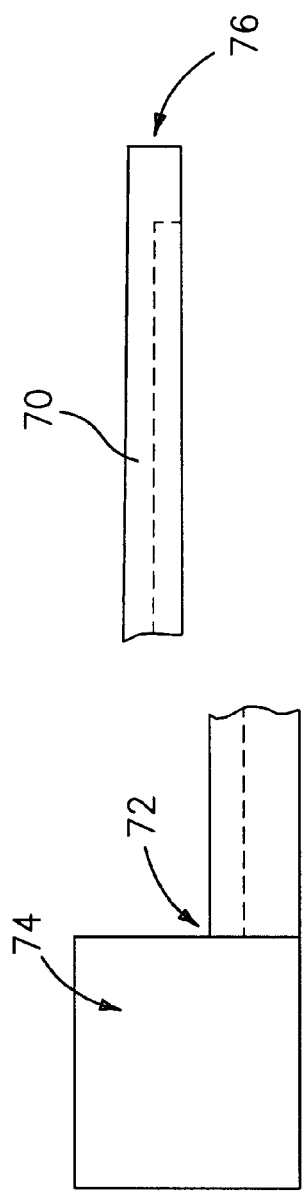
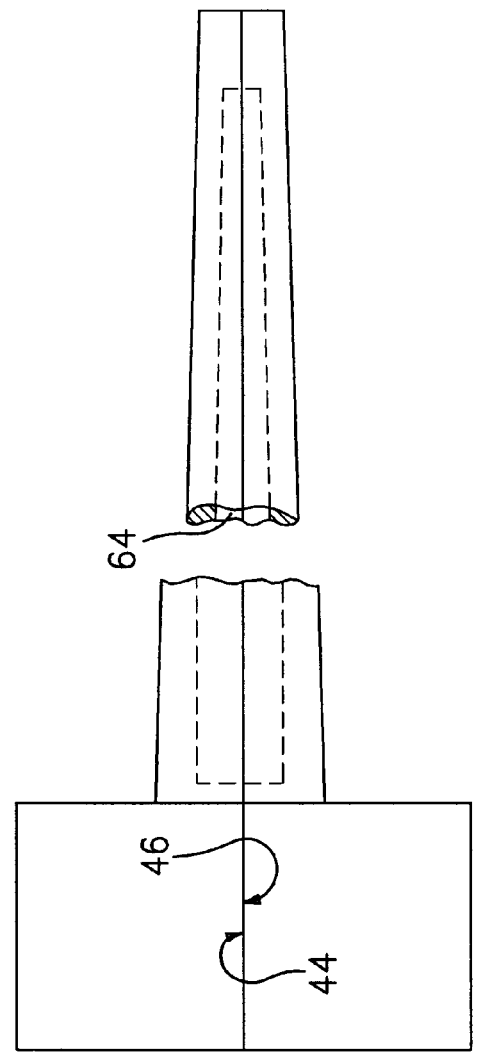
FIG. 3
FIG. 4

TURBINE ELEMENT MANUFACTURE

BACKGROUND OF THE INVENTION (1) Field of the Invention

This invention relates to the manufacture of turbine elements such as airfoils like blades and vanes. More particularly the invention relates to the manufacture of turbine elements via diffusion bonding of multiple components.

(2) Description of the Related Art

The use of diffusion bonding in turbine blade formation is well known. Examples are found in U.S. Pat. Nos. 5,063,662 and 5,711,068, the disclosures of which are incorporated by reference herein as if set forth at length. The '662 patent discloses a detailed process for forming a twisted hollow blade having internal structure. The process involves the diffusion bonding of two blade halves followed by additional deformation and machining. The '068 patent discloses a specific situation in which the two blade halves are cut from a single piece and are diffusion bonded with uncut surfaces facing each other.

BRIEF SUMMARY OF THE INVENTION

Accordingly, one aspect of the invention is directed to a method of manufacturing a hollow element. One or more metallic members are each cut into first and second pieces. Each first and second piece has a cut side with a cut side surface and an opposite surface on a side substantially opposite the cut side. The cut sides are machined to form interior features. The uncut sides are machined to form exterior features. Each first piece is assembled with a second piece to form an assembly. The cut sides of the first and second pieces face each other. The assembly is diffusion bonded.

In various implementations, the assembly may involve contacting the cut side surface of each first piece with the cut side surface of the associated second piece. The diffusion bonded assembly may be deformed to twist a portion of the assembly. An exterior of the diffusion bonded assembly may be finish machined. The machining of the cut sides of the first and second pieces may respectively form non-identical first and second interior features. The machining of the uncut sides of the first and second pieces may respectively form non-identical first and second exterior features. The machining of the cut sides of the first and second pieces may respectively form first and second pluralities of ribs. The diffusion bonding may join respective ones of the first plurality of ribs to associated ones of the second plurality of ribs to form a plurality of elongate webs joining the first and second pieces.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 3 is a view of the piece of FIG. 2 after exterior machining.

FIG. 4 is a view of two assembled machined pieces.

Like reference numbers and designations in the various drawings indicate like elements.

DETAILED DESCRIPTION

Figure 1:
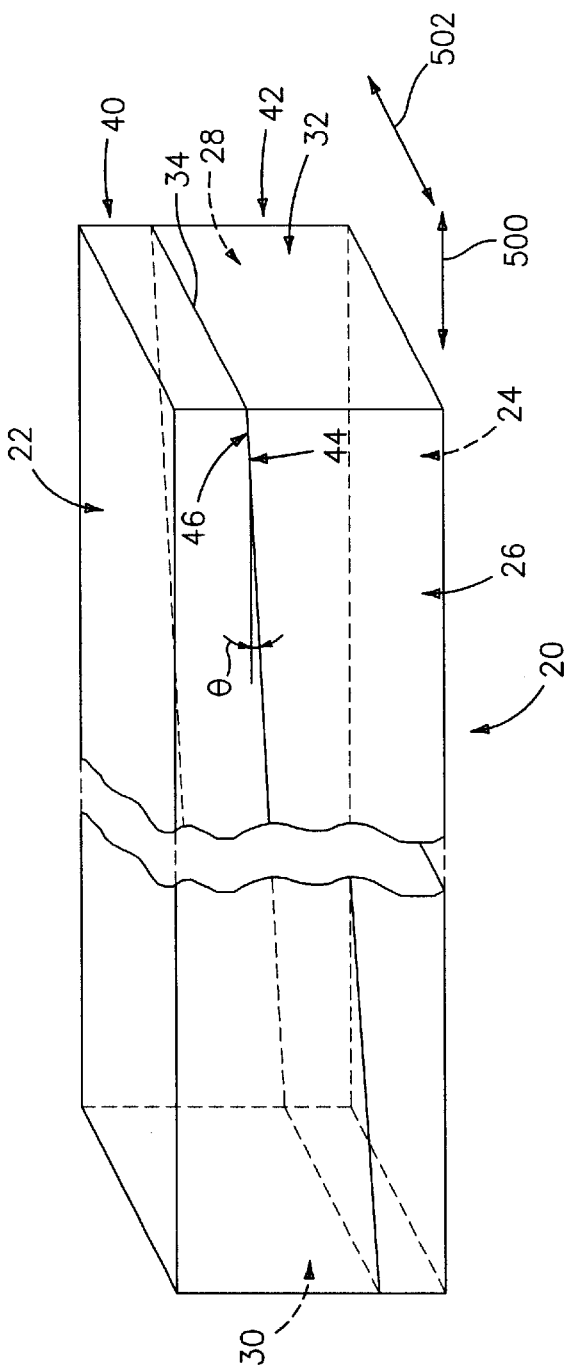
FIG. 1 is a view of stock material from which the airfoil of the present invention is formed.

FIG. 1 shows a metallic member 20 formed as a single piece of stock material. The exemplary member 20 is formed from a titanium alloy as a right parallelepiped having six sides identified for reference only as: a top 22; a bottom 24; first and second sides 26 and 28; and first and second ends 30 and 32. The member 20 may be cut from a larger piece (e.g., a sheet, plate, or strip; not shown) and its surfaces machined for precision. The exemplary member 20 is cut into two pieces along a cut 34. The exemplary cut 34 is planar and extends between the ends 30 and 32 from a location offset from the edge between top 22 and end 30 to a location offset from the edge between top 22 and end 32. Alternatively, cut 34 could extend between the aforementioned edges. The exemplary cut is at an angle θ relative to a longitudinal direction 500 and is parallel to a transverse direction 502. The exemplary angle θ is relatively shallow (e.g., between 1° and 7°). Exemplary cutting techniques are use of a bandsaw, electrodischarge machining (EDM), laser cutting, and/or jet cutting.

Figure 2:
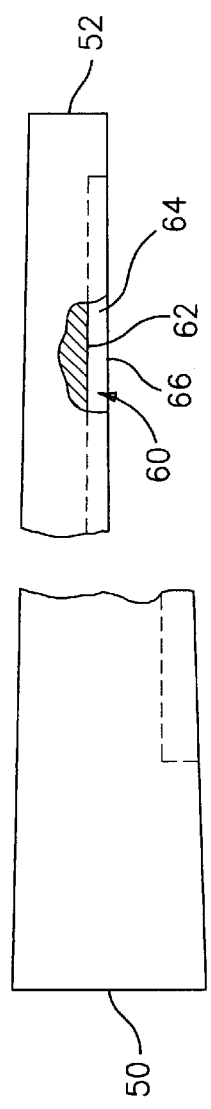
FIG. 2 is a longitudinal side view of a piece cut from the stock material of FIG. 1, the piece eventually comprising one half of the airfoil of the present invention.

The cut 34 divides the member into two pieces 40 and 42 having respective cut surfaces 44 and 46. The cut surface 44 is generally opposite the top 22 and the cut surface 46 is generally opposite the bottom 24. Each piece has first and second ends which are portions of the respective first and second ends 30 and 32 of the member 20. Due to the inclination of the cut 34, one end of each piece is relatively large and one end of each piece is relatively small. FIG. 2 shows the relatively large end 50 and the relatively small end 52 of a given piece.

After the cutting, the cut surfaces may be machined to provide a suitable finish. Interior features may also be machined in the cut surfaces. FIG. 2 shows channels 60 having bases 62 and separated by ribs 64. The exemplary ribs have end rim surfaces 66 formed as portions of the planarized cut surface. These channels form a hollow interior in the resulting airfoil for weight reduction. Exterior features may then be machined including the rough exterior half airfoil shape 70 of FIG. 3. This half airfoil has a proximal root 72 at a relatively unmachined root block portion 74 and a distal tip 76. Root block mounting features (not shown) may also be machined at this point for fixing the blade in a turbine rotor disk (not shown). This exemplary exterior machining removes substantial material from the initially uncut surface and provides a shape to the piece that helps achieve the desired resulting shape of the airfoil after the subsequent processing described below. The machining forms the two halves as flank components for the ultimate airfoil. The machined interior and exterior features may be identical, may be symmetric, or may be asymmetric. For example, asymmetry may provide initial camber to the airfoil which may be enhanced by deformation discussed below.

The two halves may be assembled with intact portions of the cut surfaces 46 and 44 contacting each other. This assembly brings the rim surfaces of the respective ribs 64 into contact with each other. The assembly may use registration features (e.g., pegs; not shown). Optionally, one or more intervening layers may separate the two pieces in the stack. Optionally, additional root block augmentation or other additional pieces may be assembled to the two pieces. The net assembly is then diffusion bonded using known techniques to integrate the assembly into a blade preform.

Figure 5:
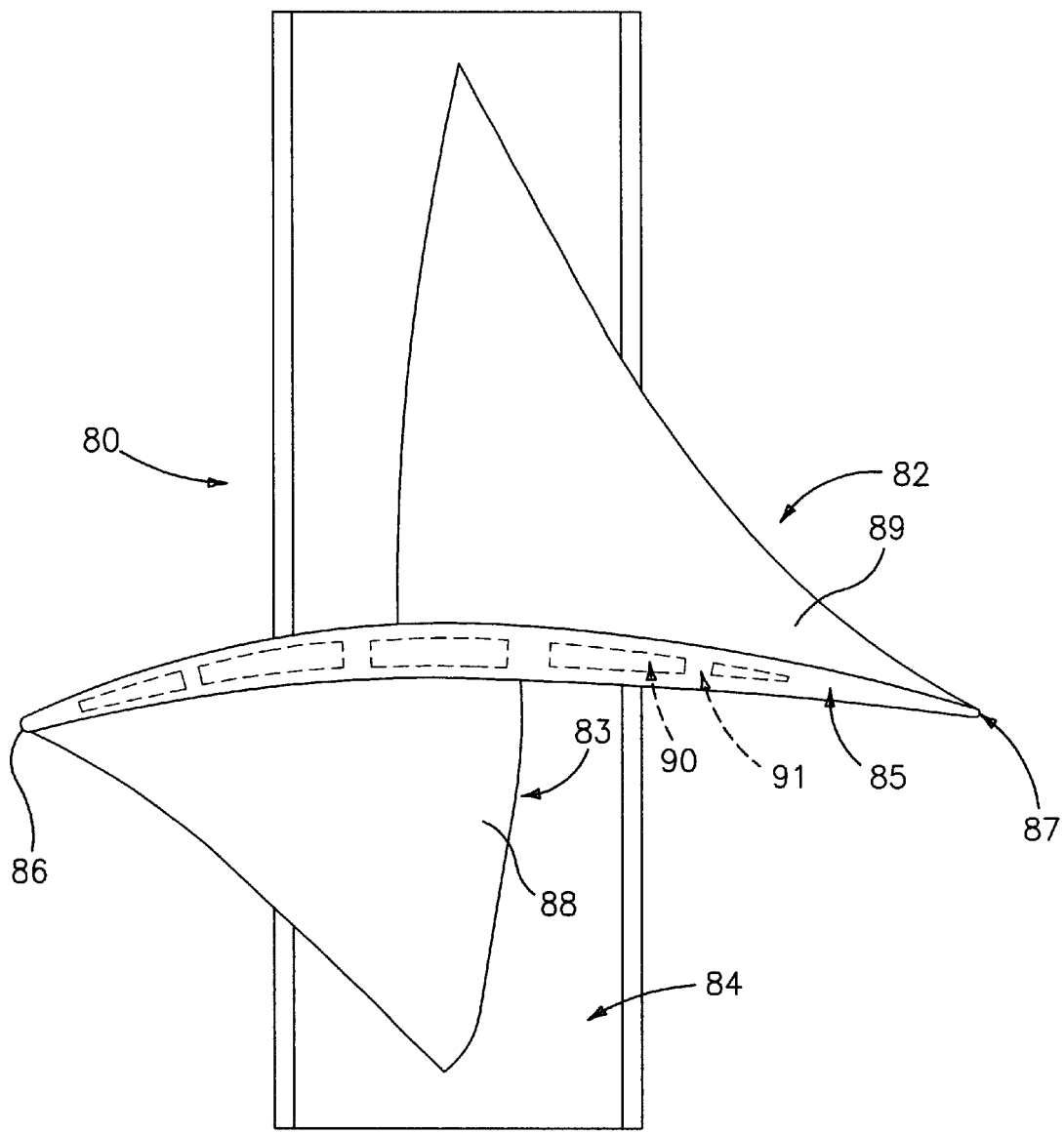
FIG. 5 is an end view of an airfoil formed from the assembled pieces of FIG. 4.

After diffusion bonding, there may be additional machining and/or deforming steps. For example, there may be a rough trimming/machining of the diffusion bonded preform assembly followed by a hot forming superplastic deformation to impart twist to the blade airfoil, both using known techniques. FIG. 5 shows a resulting blade 80 having an airfoil 82 extending from a proximal root 83 at a root block 84 to a distal tip 85. The airfoil has leading and trailing edges 86 and 87 separating pressure and suction sides 88 and 89. As described earlier, the airfoil has a number of internal channels 90 formed by pairs of the channels 66 of the two pieces and separated by webs 91 formed by the bonded ribs 64 of the two pieces. Hot forming may be followed by a finish machining and treatment process. Additional root block mounting features (not shown) may also be machined at this point.

One or more embodiments of the present invention have been described. Nevertheless, it will be understood that various modifications may be made without departing from the spirit and scope of the invention. For example, the methods may be used to manufacture various styles of blade. Accordingly, other embodiments are within the scope of the following claims.

What is claimed is:

1. A method of manufacturing a hollow element comprising:
    cutting each of a plurality of metallic members into a first piece and a second piece, the first and second pieces each having a cut side surface on a cut side and an opposite surface on a side substantially opposite the cut side;
    machining the cut sides of the first and second pieces to form interior features;
    machining the uncut sides of the first and second pieces to form exterior features;
    assembling each of the first pieces with an associated one of the second pieces to form an assembly, with the cut sides of such first and second pieces facing each other; and
    diffusion bonding the assembly.

2. The method of claim 1 wherein the assembling comprises contacting the cut side surface of each first piece with the cut side surface of the associated second piece.

3. The method of claim 1 further comprising:
    deforming the diffusion bonded assembly to twist a portion of such assembly.

4. The method of claim 1 further comprising:
    finish machining an exterior of the diffusion bonded assembly.

5. The method of claim 1 wherein:
    said machining the cut sides of the first and second pieces respectively forms non-identical first and second interior features; and
    said machining the uncut sides of the first and second pieces respectively forms non-identical first and second exterior features.

6. The method of claim 1 wherein:
    said machining the cut sides of the first and second pieces respectively forms first and second pluralities of ribs; and
    said diffusion bonding joins respective ones of the first plurality of ribs to associated ones of the second plurality of ribs to form a plurality of elongate webs joining the first and second pieces.

7. A manufacturing process for the production of a preform of a hollow turbine blade, the preform being a diffusion bonded stack of metallic blade components including first and second flank components, each flank component comprising a root portion which in the finished blade serves for fixing the blade in a rotor disk and an airfoil portion extending from the root portion to a radially outer tip, the process for producing the preforms comprising the steps of
    (a) producing pieces of metallic material in generally parallelepiped form, the parallelepipeds each having a length of at least the length of the preform from root to tip,
    (b) cutting each parallelepiped lengthwise along an inclined plane to form two separate panels of longitudinally tapering thickness, each panel having a cut surface and an uncut surface,
    (c) producing blade flank components from the panels by shaping the panels on their cut surfaces, or their uncut surfaces, to form a three dimensional profile thereon which in the finished blade will produce a hollow interior of the blade,
    (d) assembling the stack of blade components with the surfaces of the blade flank components which were cut in step (b) facing each other, and
    (e) diffusion bonding the components in the stack together.

8. A manufacturing process according to claim 7 including an additional step after step (e) of superplastically forming the blade preform.

9. A manufacturing process for the production of a preform of a hollow blade, the preform being a diffusion bonded stack of metallic blade components including first and second blade flank components, each flank component comprising a root portion which in the finished blade serves for fixing the blade in a rotor disk and an airfoil portion extending from the root portion to a radially outer tip, the process for producing the preforms comprising the steps of
    (a) producing pieces of metallic material in generally parallelepiped form, the parallelepipeds each having a length of at least the length of the preform from root to tip,
    (b) cutting each parallelepiped lengthwise along an inclined plane to form two separate longitudinally tapering panels, each panel having a cut surface and an uncut surface,
    (c) producing the blade flank components from two of the panels by shaping the panels on their cut surfaces to form a three dimensional profile thereon which in the finished blade will produce a hollow interior of the blade,
    (d) placing the blade flank components together in registration with each other to produce the stack of blade components, wherein the cut surfaces of the blade flank components face each other, and
    (e) diffusion bonding the components in the stack together.

10. A manufacturing process according to claim 9 including an additional step after step (e) of superplastically forming the blade preform.

\* \* \* \* \*